(12) United States Patent
Oka

(10) Patent No.: US 6,871,924 B2
(45) Date of Patent: Mar. 29, 2005

(54) MULTI-MODE DIRECT PRINT ADAPTER

(75) Inventor: Kiyoshi Oka, Huntington Beach, CA (US)

(73) Assignee: Canon U.S.A., Inc., Lake Success, NY (US)

(*) Notice: Subject to any disclaimer, the term of this patent is extended or adjusted under 35 U.S.C. 154(b) by 54 days.

(21) Appl. No.: 10/309,825

(22) Filed: Dec. 5, 2002

(65) Prior Publication Data

US 2004/0109669 A1 Jun. 10, 2004

(51) Int. Cl.[7] .............................................. B41J 29/38
(52) U.S. Cl. ................................................ 347/5
(58) Field of Search ........................... 347/5, 7, 9, 10, 347/14, 11, 141, 142, 143, 144, 20; 377/94, 111, 118

(56) References Cited

U.S. PATENT DOCUMENTS

2003/0220984 A1 * 11/2003 Jones et al. ................. 709/219

OTHER PUBLICATIONS

U.S. Appl. No. 09/895,186, filed Jul. 2, 2001.
U.S. Appl. No. 10/188,423, filed Jul. 2, 2002.

* cited by examiner

*Primary Examiner*—Raquel Yvette Gordon
(74) *Attorney, Agent, or Firm*—Fitzpatrick, Cella, Harper & Scinto

(57) ABSTRACT

An access device for accessing data stored on a removable digital storage medium, where the access device is connectable to a printing device and a computing device. The access device includes a media interface to the removable digital storage medium and a device interface to the printing device and the computing device. The access device also includes one or more buttons and a selector for selecting an operating mode from two or more operating modes. The two or more operating modes include a direct-print mode and a client mode, wherein the one or more buttons launch one or more software modules in the access device when in the direct-print mode and launch one or more software modules in the computing device when in the client mode.

16 Claims, 10 Drawing Sheets

MULTI-MODE DIRECT PRINT ADAPTER

BACKGROUND OF THE INVENTION

1. Field of the Invention

The invention concerns a device for accessing and processing data stored on removable digital storage media. In particular, the invention concerns a media reading device having programmable buttons for launching processes either in the media reading device or in a connected device, where the media reading device operates in one of multiple selectable operating modes.

2. Description of the Related Art

Digital photography has greatly expanded the options available for both processing and sharing acquired images. As digital technology continuously improves, more and more individuals are using digital photography in place of traditional photography. Accordingly, digital photography is drawing a wide range of individuals having varying degrees of technical ability and understanding.

Digital photography typically involves acquiring digital images with a digital camera that utilizes a type of removable digital storage media to store the images. Once images have been acquired using a digital camera, the images are typically uploaded to a personal computer for further processing and printing. Using software applications running on the personal computer, digital images can be edited and modified according to a user's preferences. Once the user has finished processing the images on the personal computer, a photo printer connected to the personal computer can then be used to print hard copies of the acquired images in a format similar to that used in traditional photography.

While there is demand for improvements in the number and complexity of features available with digital photography, such as sophisticated software applications having large numbers of editing and processing features and photo printers which can generate fast, high-quality prints, there is also demand to provide digital photography solutions that are both easy and convenient to use. A variety of solutions have recently been offered to simplify certain parts of the digital photography process. For example, digital photography systems have been offered which allow a user to print images stored in a digital camera by connecting the camera directly to a printer and using the digital camera to select and request print jobs for acquired images. These systems have drawbacks, however, which limit their usefulness. In particular, these systems typically require the digital camera and the printer to communicate using a common protocol. Accordingly, a user of one of these systems is limited in their choice of digital cameras and printers since compatible digital cameras and printers must typically come from the same manufacturer, or at a minimum have the same protocol installed by the respective manufacturers. Furthermore, printers configured for these systems typically require greater processing power and therefore cost more to produce and sell.

Other simplifying solutions include systems in which a media reader is connected to a personal computer and is equipped with controls for triggering applications on the personal computer. For example, individual buttons on the media reader might cause the personal computer to upload the images stored in removable digital storage media inserted in the media reader to a designated directory in the memory of the personal computer. Another button might cause the personal computer to upload the stored images and send them to a printer attached to the personal computer for printing. While these systems allow a user to utilize the capabilities of a personal computer without actually having to use the personal computer, these systems still require a user to have a personal computer for connecting to the media reader to run the necessary applications.

SUMMARY OF THE INVENTION

The present invention addresses the foregoing concerns by providing a single device having multiple selectable operating modes for accessing data stored on a removable digital storage medium. Specifically, the invention provides an access device having two or more selectable operating modes where buttons on the access device launch software modules in the access device when a direct-print operating mode is selected and launch software modules on a connected computing device when a client-operating mode is selected.

According to one aspect of the invention, an access device is provided for accessing data stored on a removable digital storage medium, where the access device is connectable to a printing device and a computing device. The access device includes a media interface to the removable digital storage medium and a device interface to the printing device and the computing device. The access device also includes one or more buttons and a selector for selecting an operating mode from two or more operating modes. The two or more operating modes include a direct-print mode and a client mode, wherein the one or more buttons launch one or more software modules in the access device when in the direct-print mode and launch one or more software modules in the computing device when in the client mode.

Preferably, the access device includes a memory for storing up to a plurality of print drivers and a processor for selecting and loading one of the stored print drivers corresponding to a connected printing device when the access device is in direct-print mode.

Also preferably, the device interface is a bi-directional interface having a bus architecture and the direct-print mode is selected when a printing device is connected to the device interface and the client mode is selected when a computing device is connected to the device interface. Furthermore, it is preferable that each of the one or more buttons is assignable to one or more software modules in the access device and the computing device.

By virtue of the foregoing features of the invention, a user can utilize a single access device for accessing data stored on a removable digital storage medium and either interact directly with a connected printer without the use of a personal computer or interact with a connected personal computer to take advantage of additional functionality available thereon. By selecting and loading a print driver corresponding to a connected printing device, the present invention provides additional flexibility to a user by allowing the user to utilize a variety of types of printing devices directly with the access device.

This brief summary has been provided so that the nature of the invention may be understood quickly. A more complete understanding of the invention can be obtained by reference to the detailed description of the preferred embodiments in connection with the associated drawings.

DETAILED DESCRIPTION OF THE PREFERRED EMBODIMENTS

Figure 1:
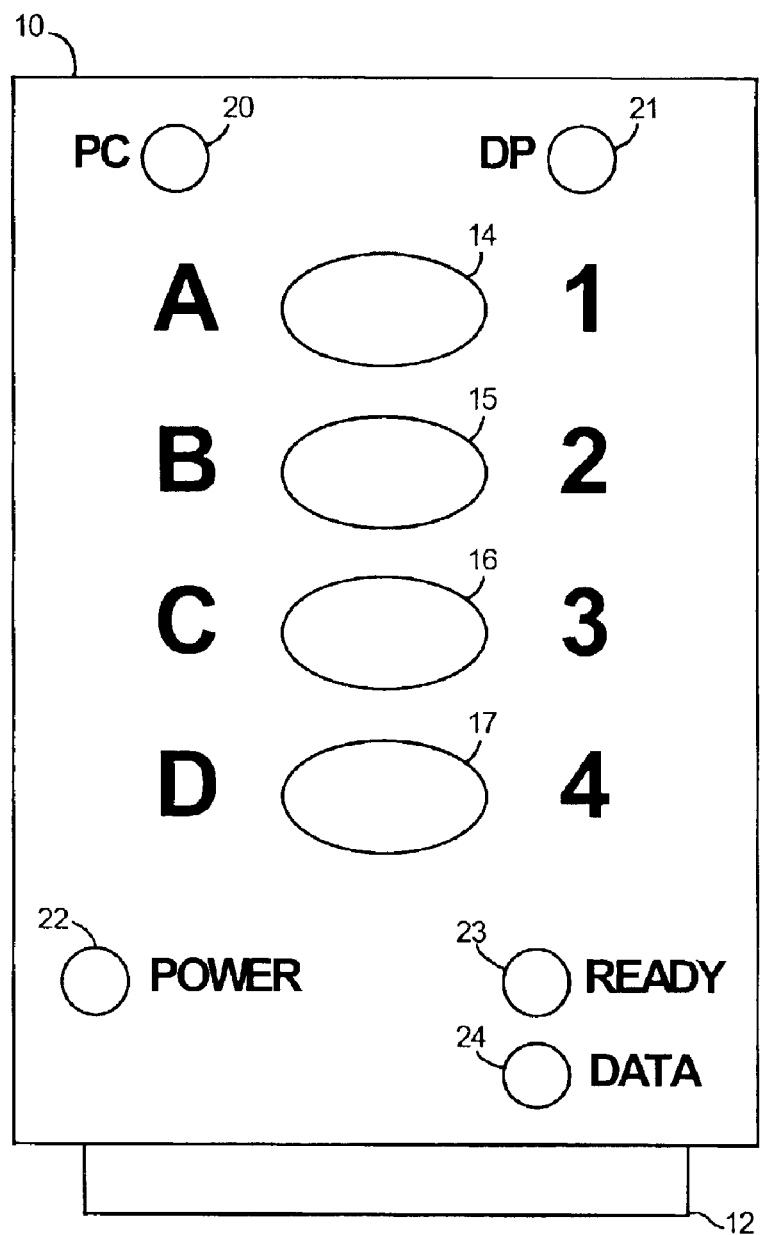
FIG. 1 is a depiction of a configuration of an embodiment of the present invention.

FIG. 1 is a depiction of a configuration of a direct print adapter according to an embodiment of the invention. As shown in FIG. 1, direct print adapter 10 includes media reader 12, buttons 14 to 17, and LEDs 20 to 24. Direct print adapter 10 also includes a bus interface (not shown) such as a port for attaching a cable connecting direct print adapter 10 to another device. The foregoing features of direct print adapter 10 will be described in more detail below.

Media reader 12 is an interface that allows direct print adapter 10 to connect to and access data stored on removable digital storage media. In the present invention, media reader 12 is configured to be compatible with a particular type of removable digital storage media. In general, removable digital storage media stores digital data, such as image data acquired by a digital camera, in a medium that can be removed from the device that generated the digital data and connected to a different device to provide access to the digital data stored thereon.

Many types of removable digital storage media exist on the market today. Some examples include Compact Flash Media, Smart Media, Sony Memory Stick, IBM Microdrive, Compact Disc (CD), Digital Versatile Disc (DVD), etc. It is to be understood, however, that media reader 12 of the present invention is not limited to accessing only the foregoing types of removable digital storage media and may be compatible with other types of removable digital storage media as well. It is also to be understood that direct print adapter 10 might include multiple media readers, where each media reader is capable of accessing data stored on a different type of removable digital storage media. For purposes of this description, however, direct print adapter 10 includes a single media reader 12 for accessing digital data stored on a single type of removable digital storage media.

Buttons 14 to 17 provide a user interface for a user of direct print adapter 10 to perform various functions. When a user depresses one or more of buttons 14 to 17, an application/function is executed either by direct print adapter 10 or a personal computer (PC) (not shown) that is connected to direct print adapter 10 through the bus interface. As depicted in FIG. 1, each one of buttons 14 to 17 is labeled with both a letter and a number. For example, button 14 is labeled with the letter "A" and the number "1". The letters correspond to applications/functions that are executed by a connected PC when direct print adapter 10 is in a PC mode. The numbers correspond to applications/functions that are executed by direct print adapter 10 when direct print adapter 10 is in a direct print mode. The PC and direct print modes, as well as the associated applications/functions, will be described in more detail below.

LEDs 20 to 24 indicate various states of direct print adapter 10 by lighting up. LED 20 indicates that direct print adapter 10 is in the PC mode. LED 21 indicates that direct print adapter 10 is in the direct print mode. LED 22 indicates that direct print adapter 10 is being powered internally rather than by a connected device. In addition, LED 22 might be configured as a button used to activate power internal to direct print adapter 10. LED 23 indicates that direct print adapter 10 is ready to operate in its determined mode. LED 24 indicates that direct print adapter 10 is in the process of transferring data. The states associated with LEDs 20 to 24 will be described in more detail below. It is to be understood that the present invention is not limited to using LEDs for indicating the various states of direct print adapter 10. For example, an LCD display might be used to display the specific states.

Figure 2:
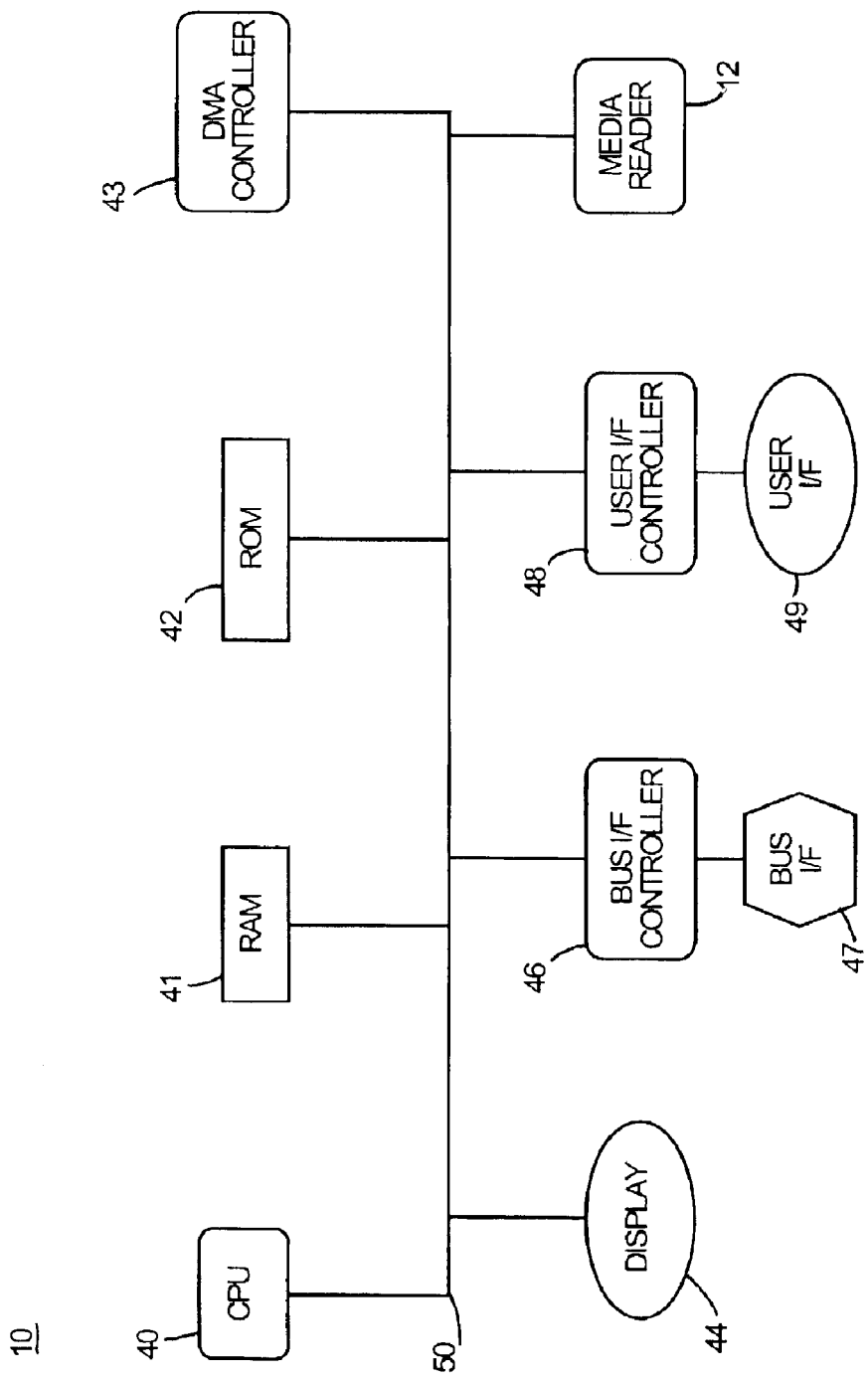
FIG. 2 is a block diagram depicting the components of an embodiment of the present invention.

FIG. 2 is a block diagram depicting components of direct print adapter 10. As shown in FIG. 2, direct print adapter 10 includes CPU 40, RAM 41, ROM 42, DMA controller 43, display 44, bus interface (Interface) controller 46, bus Interface 47, user Interface controller 48, user Interface 49, media reader 12 and bus 50. CPU 40 is a microprocessor for executing program instruction sequences. Bus 50 allows for communication between CPU 40 and the other components of direct print adapter 10. RAM 41 provides memory space for CPU 40 to fetch and execute program instructions stored on ROM 42 or on removable digital storage media accessed through media reader 12. ROM 42 stores program instruction sequences for controlling the operation of direct print adapter 10 as well as various applications for use by direct print adapter 10. The contents of ROM 42 will be discussed in more detail below. Preferably, ROM 42 is programmable to allow the data stored therein to be updated or replaced. For example, ROM 42 may be an EEPROM.

Display 44 represents the means used by direct print adapter 10 to communicate its various states to a user. As described above, the current embodiment utilizes LEDs 20 to 24 for this purpose. As also mentioned above, display 44 may constitute other forms of displays such as an LCD.

As shown in FIG. 2, direct print adapter also includes a variety of controllers. DMA controller 43 controls the access and transfer of data stored on removable digital storage media via media reader 12. DMA controller 43 facilitates the transfer of data from the removable digital storage media to a connected PC or RAM 41 for further processing by CPU 40.

Bus Interface controller 46 controls communication between direct print adapter 10 and other devices connected to direct print adapter 10 through bus Interface 47. Bus Interface controller 46 communicates with other devices connected to direct print adapter 10 using a bus architecture that allows negotiation and establishment of a host/client relationship between connected devices. This embodiment of the invention is described using the Universal Serial Bus (USB) architecture for communication between connected devices having a host/client relationship. It is to be understood, however, that other types of bus architectures may also be utilized in place of USB in practicing this invention. For example, Ethernet or IEEE 1394 might be used in place of USB.

Those skilled in the art will recognize that the USB architecture currently utilizes different interfaces and controllers depending on whether a device is to be used as a host or a client. For purposes of depicting the components of the invention, however, FIG. 2 depicts a single bus interface controller 46 and a single bus interface 47. It is to be understood that this embodiment of the invention utilizes a host controller and host interface (not shown) for connecting and communicating with downstream devices such as printers, and a client controller and client interface (not shown) for connecting and communicating with upstream devices such as a PC.

User Interface 49 represents buttons 14 to 17 depicted in FIG. 1. The invention is not limited to the use of buttons as a user interface and may utilize other means such as an LCD, together with one or more buttons, or a touch panel. User Interface controller 48 monitors buttons 14 to 17 and stores data in a button buffer when one or more of buttons 14 to 17 are depressed by a user. The operation of user Interface controller 48 will be described in more detail below.

Figure 3:
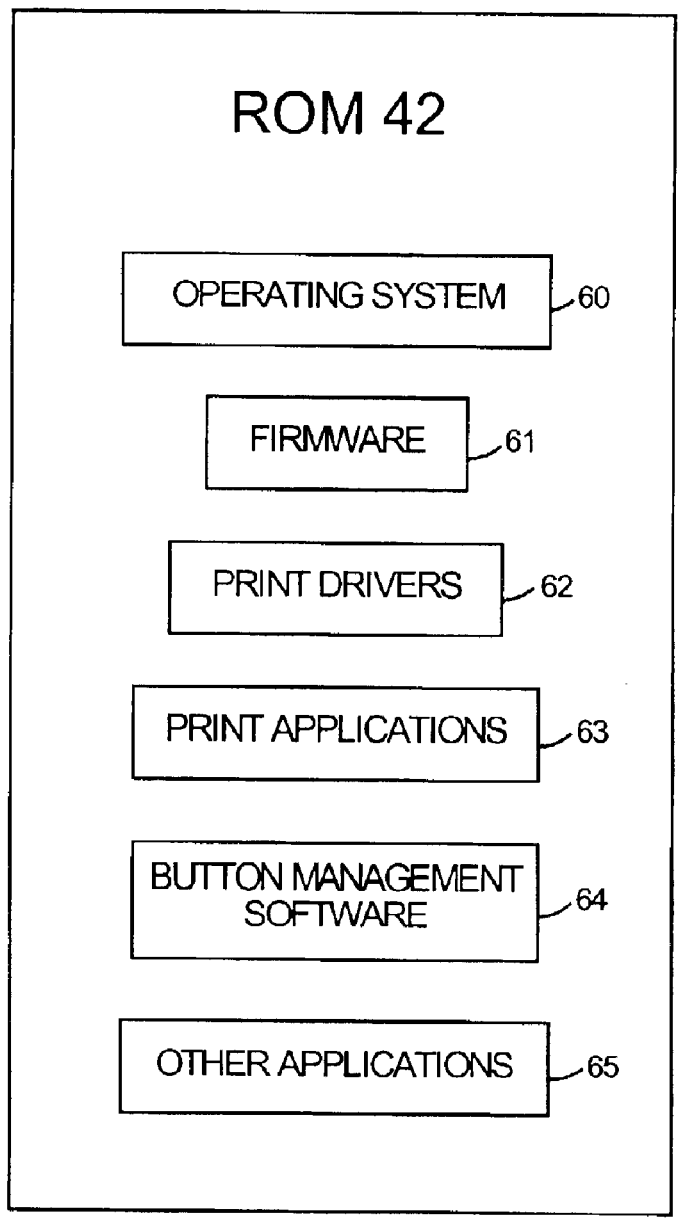
FIG. 3 is a block diagram depicting the contents of a computer-readable storage medium used in implementing an embodiment of the present invention.

FIG. 3 is a diagram depicting the contents of ROM 42. As shown in FIG. 3, ROM 42 contains operating system (OS) 60, firmware 61, print drivers 62, print applications 63, button management software 64 and other applications 65. OS 60 is an operating system for managing the applications being executed in direct print adapter 10 as well as the various components that make up direct print adapter 10. OS 60 may be a Linux or Unix based operating system that supports USB, or alternatively may be a Microsoft Windows based operating system.

Firmware 61 contains the basic operating sequences required by the various controllers in direct print adapter 10. These operating sequences allow direct print adapter 10 to operate in a client mode (PC mode) without the operation of CPU 40 executing OS 60. PC mode will be described in more detail below. Print drivers 62 facilitate preparing and sending print jobs to a printer connected to direct print adapter 10 via bus Interface 47.

Print applications 63 are various applications that process and assemble image data for printing. Print applications 63 include, but are not limited to, applications for generating index prints of image data with varying numbers of images arranged on each page, and applications for performing predetermined processing to image data prior to printing such as color correction, resizing, etc.

Button management software 64 manages an association between applications stored on ROM 42 and buttons 14 to 17 for use when direct print adapter 10 is in a host mode (direct print mode). Specifically, each button or combination of buttons is assigned to one or more applications stored on ROM 42. When one or more buttons are depressed while the direct print adapter 10 is in direct print mode, the corresponding applications are executed. Button management software 64 manages the assignment of the particular applications with the particular buttons and causes the execution of the assigned application when a user depresses a button or combination of buttons.

Other applications 65 is a group of applications that provides additional functionality to direct print adapter 10. For example, other applications 65 might include an application for adjusting or cleaning the print heads of a connected printer. Like print applications 63 discussed above, other applications 65 are assigned to particular buttons or combinations of buttons so as to be executed when a user depresses the associated buttons or combinations of buttons.

The contents of ROM 42 are not limited to those described above. Furthermore, as mentioned above, ROM 42 is preferably implemented with an EEPROM to allow the contents to be updated or replaced as required by the user of direct print adapter 10.

Figure 4:
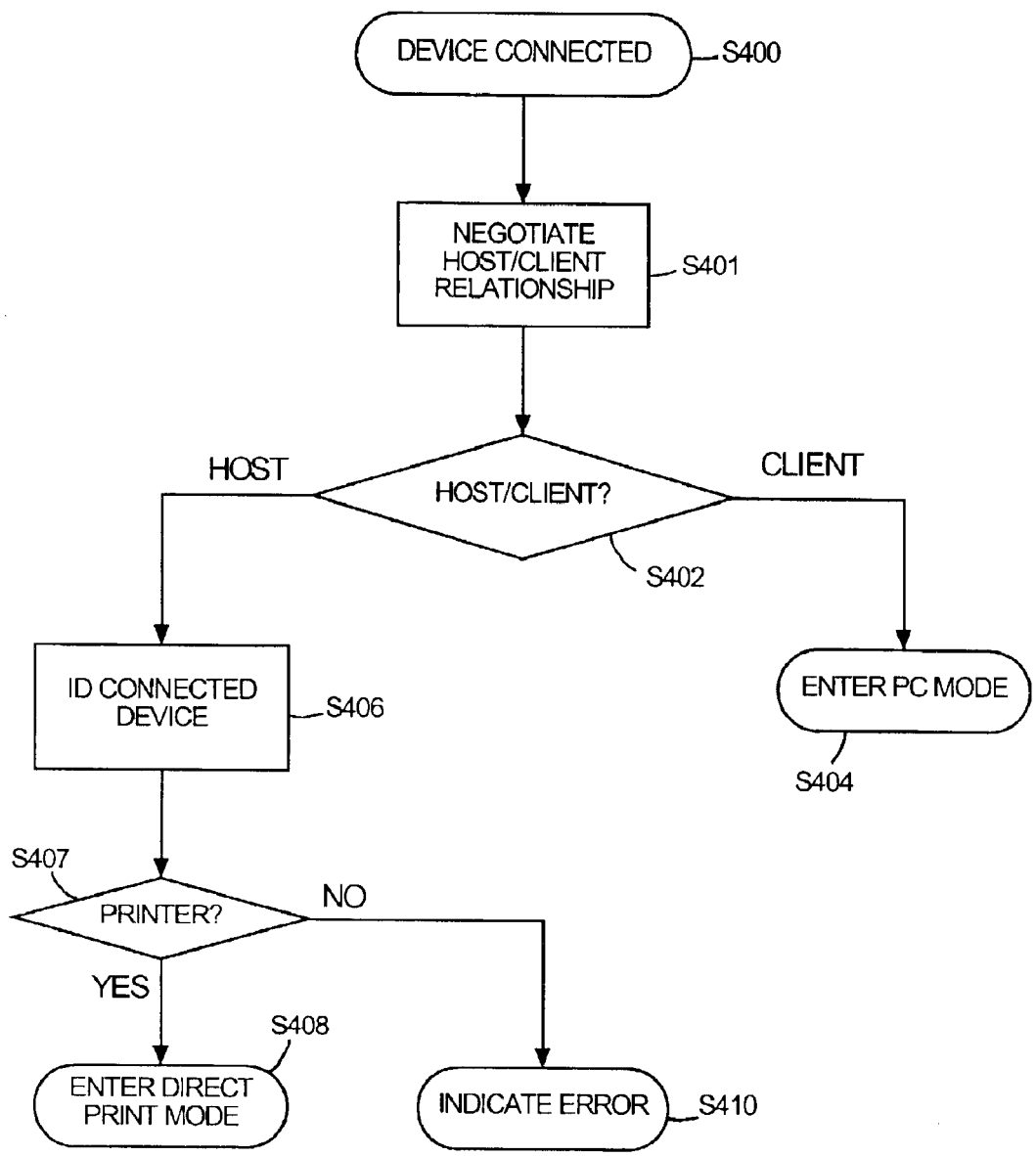
FIG. 4 is a flowchart depicting an operation of an embodiment of the present invention.

FIG. 4 is a flowchart depicting a mode-selection process according to the invention. Briefly, when a device is connected to direct print adapter 10, a host/client relationship is negotiated between the connected device and direct print adapter 10. Based on the negotiated relationship, the appropriate operation mode is selected for direct print adapter 10. A more detailed description of the process steps involved in selecting the operating mode of direct print adapter 10 will now be described.

The mode-selection process begins in step S400 when a device is connected to direct print adapter 10 via bus Interface 47. As mentioned above, this embodiment of the invention utilizes a USB interface for connecting to other devices, and accordingly has a host interface for connecting to downstream devices, such as a printer, and a client interface for connecting to upstream devices such as a PC. Once a device is connected to either the host interface or the client interface, the mode-selection process begins in step S400.

In step S401, the host/client relationship between direct print adapter 10 and the connected device is negotiated. This embodiment of the invention utilizes the standard USB device registration method for identifying and registering devices connected to a host and will not be described in detail herein. Accordingly, if a printer is connected to the host interface of direct print adapter 10, the host controller (bus Interface controller 46) identifies and registers the attached printer according to the standard USB method. Alternatively, if direct print adapter 10 is connected to a PC through the client interface, the PC's host controller identifies and registers direct print adapter 10 through the client controller (bus Interface controller 46) according to the standard USB method.

In step S402, it is determined whether direct print adapter 10 is the host or the client in the negotiated relationship with the attached device. This determination may be made by determining which of the host controller and the client controller is currently being used in the communication with the connected device. Alternatively, bus Interface controller 46 might send a signal to CPU 40 indicating whether the direct print adapter 10 is currently operating as a host or a client. If direct print adapter 10 is operating as a client, such as when connected to a PC, the process proceeds to step S404 where direct print adapter 10 enters PC mode. Step S404 will be described in more detail below in connection with FIG. 7.

If it is determined in step S402 that direct print adapter 10 is operating as a host, such as when connected to a printer, the process proceeds to step S406, where the connected device is identified. Identification of the connected device is performed using the identification information obtained during the negotiation of the host/client relationship in step S401. In step S407 it is determined-whether the connected device is a printer or not. If the connected device is not a printer, then the process proceeds to step S410 where an error is indicated to the user. The error indication can be made in a number of different ways. For example, LED 23, which indicates when direct print adapter 10 is ready to operate in the determined mode, is capable of lighting up in one of two different colors, red or green. When direct print adapter 10 is ready to operate, LED 23 lights up in green. When direct print adapter 10 experiences an error or a situation in which it cannot operate, such as when connected to a downstream device other than a printer, LED 23 lights up in red. If it is determined in step S407 that direct print adapter 10 is connected to a printer, the process proceeds to step S408 where direct print adapter 10 enters direct print mode. Step S408 will be described in more detail below in connection with FIG. 5.

Figure 5:
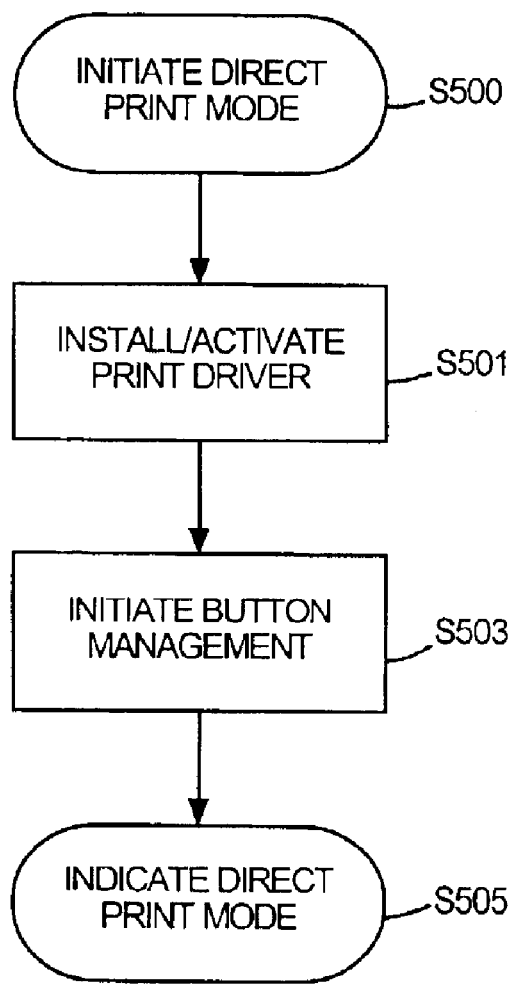
FIG. 5 is a flowchart depicting another operation of an embodiment of the present invention.

FIG. 5 is a flowchart depicting the process of direct print adapter 10 entering direct print mode. Briefly, when direct print adapter 10 is connected to a printer and direct print mode is initiated, the appropriate print driver is installed and activated and button management is initiated.

In step S500, direct print mode for direct print adapter 10 is initiated when it has been determined in step S407 that direct print adapter 10 has been connected to a printer. In step S501, a print driver that corresponds to the connected printer identified in step S406 is installed and activated. A more detailed description of the installation and activation of the print driver will be provided below in connection with FIG. 6.

In step S503, button management is initiated. Specifically, button management software 64 stored in ROM 42 is executed by CPU 40 to manage the association of particular application stored in ROM 42 with particular buttons on direct print adapter 10, as described above. In addition, a button buffer for each of buttons 14 to 17 is reset. The button buffer is located in user Interface controller 48, and stores data indicating that a user has depressed one or more of buttons 14 to 17. Alternatively, the button buffer may be located in RAM 41, thereby providing memory for larger buffers that can record multiple depressions of buttons 14 to 17. The operation of the button buffer will be described in more detail below in connection with FIG. 8.

Finally, in step S505, LED 21 is lit up to indicate that direct print adapter 10 is in direct print mode and LED 23 is lit green to indicate that direct print adapter 10 is ready to operate in the direct print mode.

Figure 6:
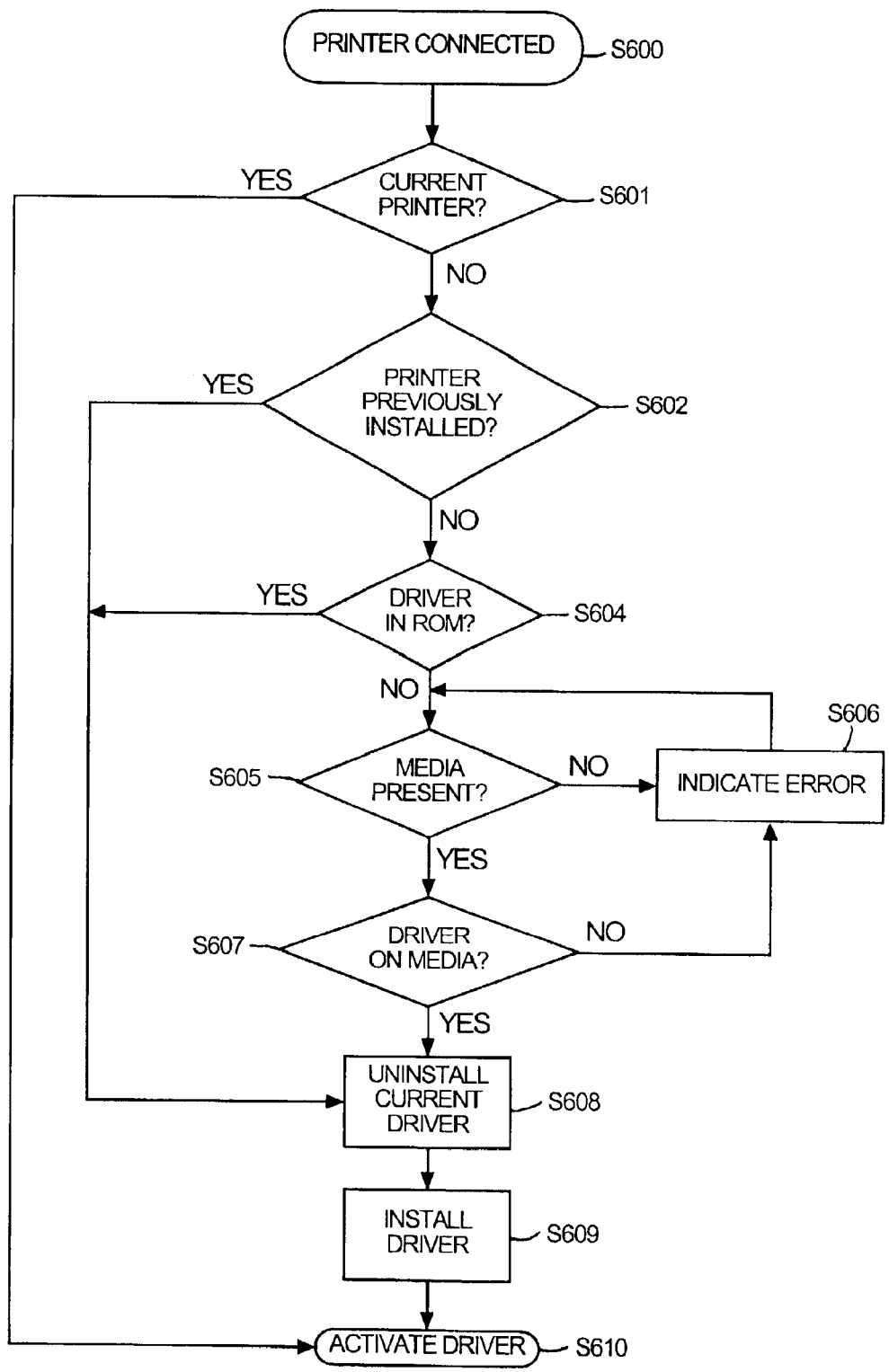
FIG. 6 is a flowchart depicting another operation of an embodiment of the present invention.

FIG. 6 is a flowchart depicting a process of installing and activating a print driver corresponding to a particular printer connected to direct print adapter 10. Briefly, direct print adapter 10 first checks whether the current print driver corresponds with the connected printer. If not, direct print adapter 10 proceeds to check in the various memories within direct print adapter 10 to try and locate the correct print driver. Once the correct print driver is located, it is installed and activated.

The print driver installation/activation process begins in step S600 once it has been determined that a printer has been connected to direct print adapter 10 and direct print adapter 10 has initiated the direct print mode. In step S601, the print driver currently installed in direct print adapter 10 is compared with the type of printer connected to direct print adapter 10 to determine if the current print driver corresponds with the type of connected printer. If the current print driver corresponds with the type of connected printer, the print driver is activated in step S610 and the print driver installation/activation process ends.

On the other hand, if the current print driver does not correspond with the type of connected printer, the type of connected printer is compared with any print drivers that were installed for printers previously connected to direct print adapter 10 since power was last provided to direct print adapter 10. When an installed print driver is replaced with a new print driver, such as when a new type of printer is connected to direct print adapter 10, the replaced print driver is stored in RAM 41 for as long as power is maintained for direct print adapter 10. Accordingly, when a new printer is connected to direct print adapter 10, previously installed print drivers stored in RAM 41 can be quickly compared with the new type of printer when searching for an appropriate print driver.

If the type of connected printer does not correspond with any previously installed print drivers, the type of connected printer is then compared with print drivers 62 stored in ROM 42 in step S604. As indicted above, ROM 42 contains print drivers 62. Print drivers 62 are one or more print drivers corresponding to one or more types of printers that are anticipated as possibly being used with direct print adapter 10. Prior to the first printer being connected to direct print adapter 10 since power was provided, there are no print drivers installed or stored in RAM 41. Accordingly, for the first connected printer, the needed print driver will not be located in steps S601 and S602. If the print driver corresponding to the connected printer is located in ROM 42, the process proceeds to steps S608 and S609 where the current print driver, if any, is uninstalled and the newly identified print driver is installed. Processing then proceeds to step S610 where the newly installed print driver is activated and the print driver installation/activation process comes to an end.

In the event that a user needs to connect direct print adapter 10 to a unique or unusual printer, for which ROM 42 contains no corresponding print driver, a user can install the needed print driver from removable digital storage media connected with media reader 12. Accordingly, if the needed print driver is not found in ROM 42 in step S604, it is determined in step S605 whether removable digital storage media is present in direct print adapter 10. If removable digital storage media is present, it is determined in step S607 whether the needed print driver is stored thereon. If the needed print driver is found in step S607, processing proceeds to steps S608, S608 and S610, which are described above. Alternatively, if the needed print driver is not found on the removable digital storage media, or there is no removable digital storage media currently connected to direct print adapter 10, an error is indicated in step S606 and the process returns to step S605 to again check for the presence of removable digital storage media. The error indicated in step S606 may be shown in a number of ways. For example, LED 23 is lit red in the event that the correct print driver could not be found.

Figure 7:
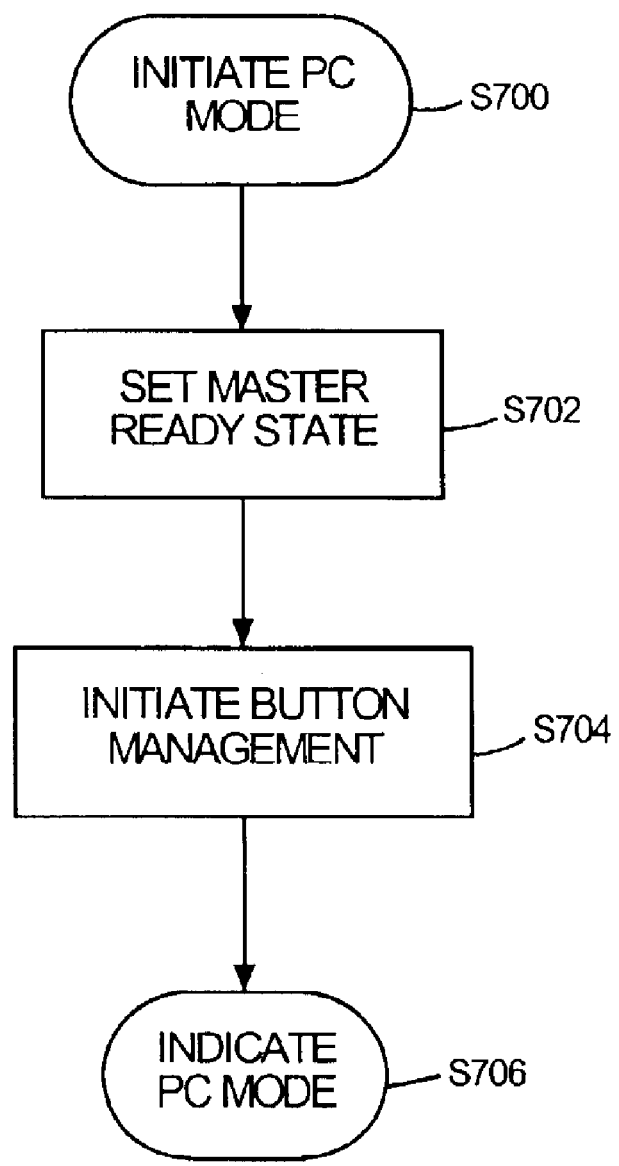
FIG. 7 is a flowchart depicting another operation of an embodiment of the present invention.

FIG. 7 is a flowchart depicting a process of direct print adapter 10 entering PC mode. When it is determined in step S402 that direct print adapter 10 is acting as a client in the relationship with the connected device, such as when connected to a PC, the direct print adapter 10 initiates PC mode in step S700.

Direct print adapter 10 can be in a variety of different states depending on various conditions. If no power is being provided to direct print adapter 10, and no devices are currently connected, direct print adapter 10 waits in an idle state for either a host device, such as a PC, to be connected, or for power to be provided. Power can be provided to direct print adapter either through its own power source (not shown), internally or externally, or via the connection with a host device such as a PC. When power is provided through its own source, direct print adapter 10 enters a master state in which CPU 40 executes OS 60 and host controller polls bus Interface 47 to determine when a client device, such as a printer, is connected to direct print adapter 10. The master state continues until a device is connected to direct print adapter 10, at which time the process depicted in FIG. 4 is carried out. However, if direct print adapter 10 is in the master state when a host device is connected to direct print adapter 10, direct print adapter 10 sets a master ready state in step S702. In the master ready state, power is maintained to direct print adapter 10, however, the host controller stops polling bus Interface 47 for connected devices, any installed print driver is uninstalled, and CPU 40 stops executing OS 60.

In step S704, button management is initiated in the same manner as described above with respect to step S503. Finally, LED 20 is lit to indicate that direct print adapter 10 is in PC mode and LED 23 is lit green to indicate that direct print adapter 10 is ready to operate in PC mode.

Figure 8:
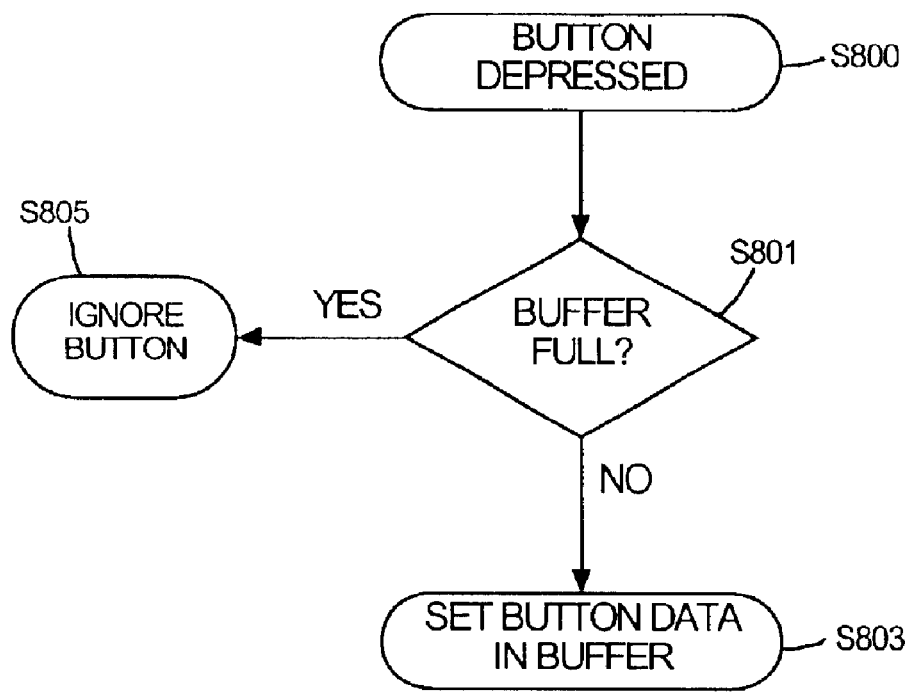
FIG. 8 is a flowchart depicting another operation of an embodiment of the present invention.

As mentioned above, user Interface controller 48 monitors buttons 14 to 17 to determine when a user has depressed one or more of the buttons. When one or more of buttons 14 to 17 have been depressed, user Interface controller 48 sets button data corresponding to the depressed one or more buttons in a button buffer. FIG. 8 is a flowchart depicting a process for setting information in the button buffer. Briefly, user Interface controller 48 checks the current state of the button buffer and sets button data in the buffer, if possible, when one or more buttons are depressed by a user.

The process depicted in FIG. 8 begins in step S800 when user Interface controller 48 detects that a button has been depressed. In step S801, user Interface controller 48 determines whether the button buffer associated with the depressed button is full. The button buffer may be located in user Interface controller 48 and have the capacity to store data indicating that the button associated with the button buffer has been depressed once. Accordingly, once a button has been depressed, the associated button buffer is full and user Interface controller 48 cannot set any more data in that particular button buffer. Alternatively, the button buffer may be located in RAM 41 and thereby have sufficient capacity to store data indicating that a button associated the button buffer has been depressed multiple times.

If it is determined in step S801 that the button buffer is full for the particular depressed button, the button depression is ignored in step S805. If the button buffer for the depressed button is not full, the button data is set in the particular button buffer in step S803.

Figure 9:
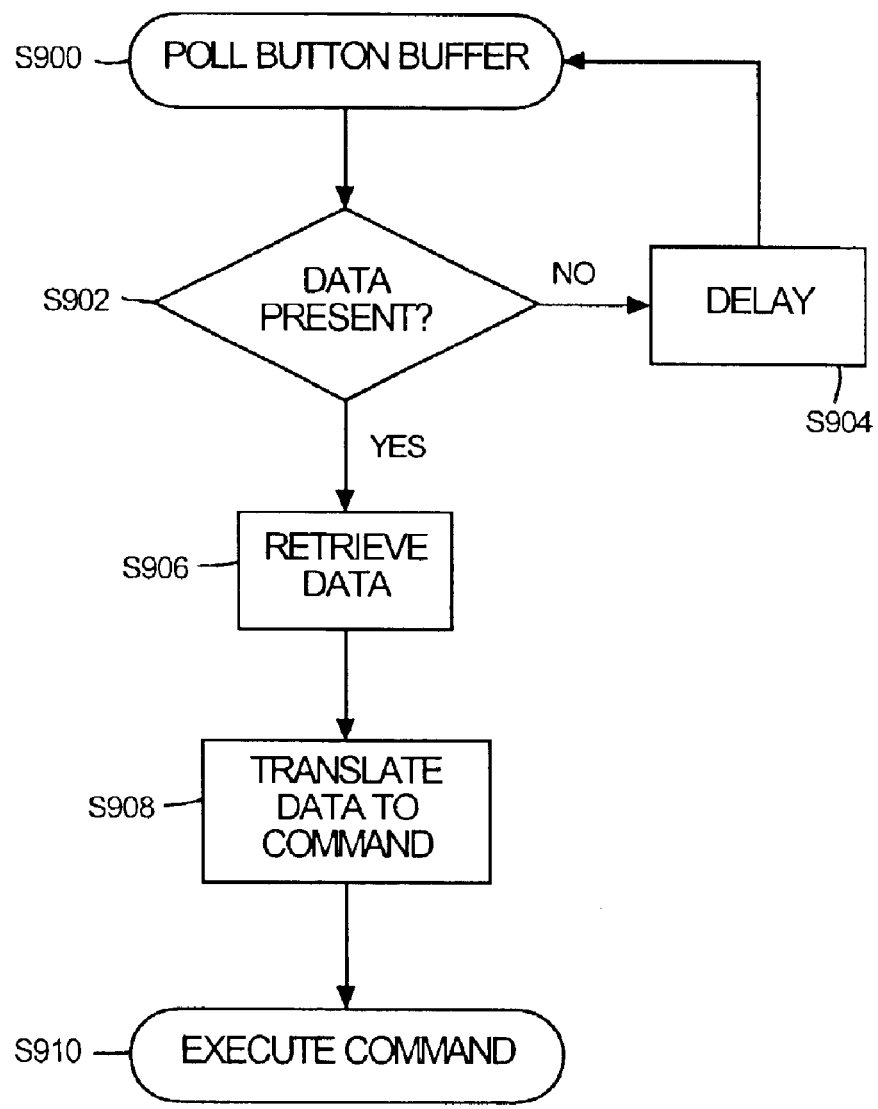
FIG. 9 is a flowchart depicting another operation of an embodiment of the present invention.

FIG. 9 is a flowchart depicting a process in which button management software polls the button buffer and executes commands in accordance with data stored in the button buffer. Initially, it is noted that the process depicted in FIG. 9 can be executed by either direct print adapter 10 using button management software 64 when direct print adapter 10 is in direct print mode, or by a connected PC when direct print adapter 10 is in PC mode using button management software executed by the PC.

In step S900, the button management software polls the button buffer to determine if data indicating that one or more buttons have been depressed has been set therein. In step S902, it is determined whether data is present in the button buffer. If no data is present, indicating that no buttons have been depressed, a delay is incurred in step S904, after which step S900 is repeated and the button buffer is polled again.

If it is determined in step S902 that data has been set in the button buffer, the data is retrieved in step S906. The retrieved data is then translated into a command and any necessary parameters are added to the command in step S908. Added parameters include, but are not limited to, a drive designation for the removable digital storage media, data storage location, target-working path, etc. As mentioned above, the button management software manages associations between particular buttons and particular applications. Accordingly, when a particular button is depressed, button management software determines which button was depressed from the data stored in the button buffer and identifies the particular application associated with the depressed button.

As described above with respect to the configuration of the invention depicted in FIG. 1, buttons 14 to 17 correspond with applications/functions "A" to "D", respectively, when direct print adapter 10 is in the PC mode, and applications/functions "1" to "4", respectively, when direct print adapter 10 is in the direct print mode. Applications/functions "A" to "D" include, but are not limited to, automatically uploading data stored on removable digital storage media to a designated directory in the memory of a connected PC, launching an email client to email the stored data to a designated email address, performing a predetermined index print of stored image data, performing a particular type of photo-print process on stored image data, etc. Each of the applications/functions "A" to "D" are stored and executed on a connected PC. Applications/functions "1" to "4" include, but are not limited to, index printing of image data stored on removable digital storage media, predetermined image processing and photo printing of stored image data, print head adjustment, print head cleaning, etc. Applications/functions "1" to "4" are stored on ROM 42 and are executed by CPU 40 when direct print adapter 10 is in direct print mode.

While FIG. 1 depicts direct print adapter 10 with the generic labels "A" to "D" and "1" to "4" representing the various assigned applications/functions, it is also possible to replace the generic labels with specific labels identifying the application/function, such as "index print", "email", "upload", "index 15" (indicating an index print with 15 images per page), etc., associated with each button in the PC mode and the direct print mode.

The foregoing description describes each of buttons 14 to 17 being associated with a particular application/function for each of PC mode and direct print mode. However, the invention is not limited to this configuration. For example, using a relatively large button buffer large with sufficient capacity to store data indicating multiple button depressions, applications/functions could be associated with multiple button depressions or depressions of different combinations of buttons. In addition, the depression of a single button might also be configured to cause multiple applications/functions to execute in parallel or in succession.

Finally, in step S910, the translated command to perform the designated application/function is executed.

Figure 10:
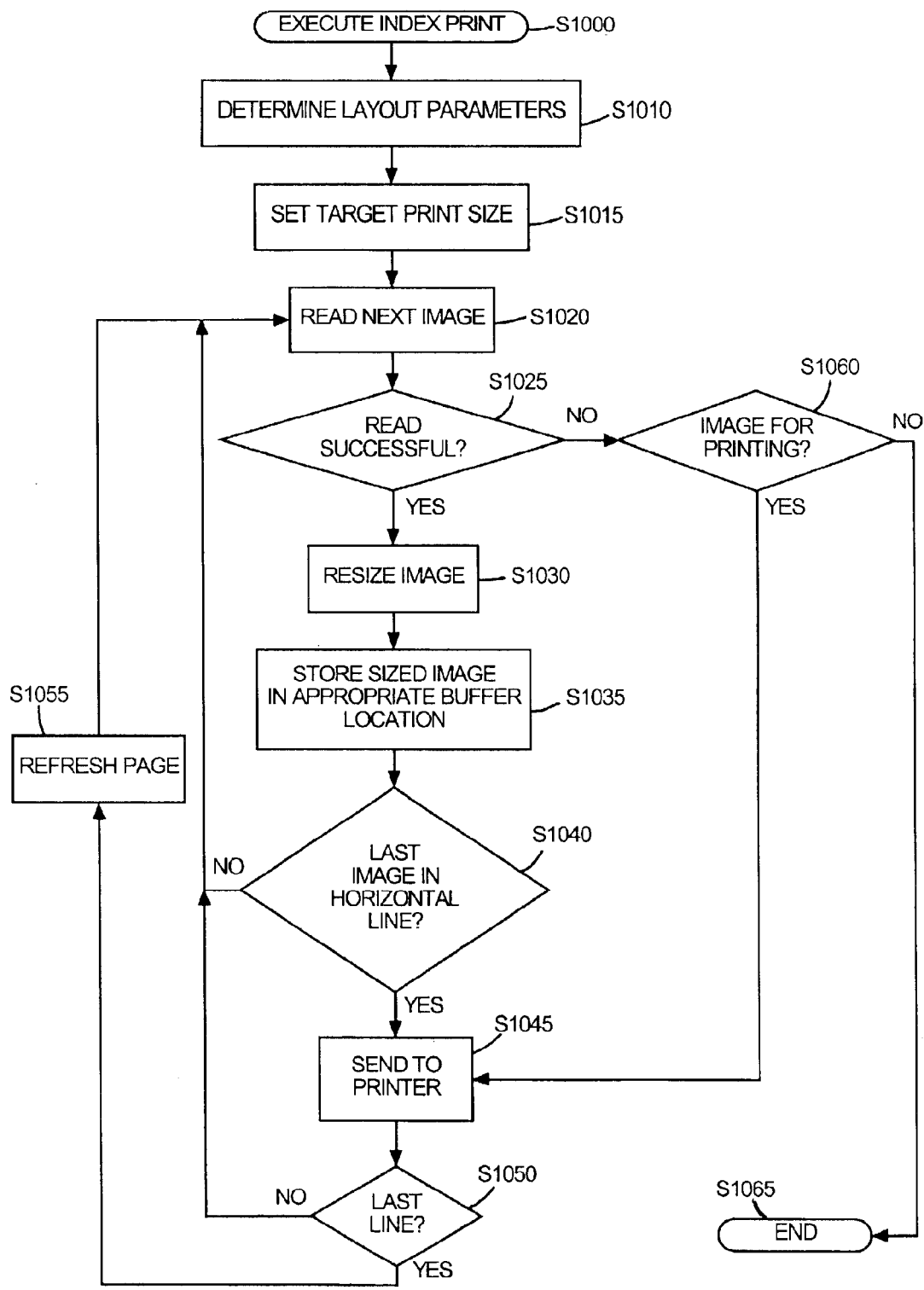
FIG. 10 is a flowchart depicting another operation of an embodiment of the present invention.

FIG. 10 is a flowchart depicting a process for generating an index print of image data stored in connected removable digital storage media. Index printing of various dimensions is one of the possible functions available to a user when using direct print adapter 10 in the direct print mode. Briefly, the layout of an index print is determined and images are sized and sent the connected printer one horizontal row at a time.

When a particular index print is the command translated in step S908, and that command is executed in step S910, processing begins for the index print in step S1000. In step S1010, the layout parameters for the particular index print are determined. The layout parameters include the total number of images on each page, the number of images in each row, the maximum size for each image, etc. In step S1015, the target print size for the images in the index print is set based on the layout parameters determined in step S1010.

In step S1020, the next image stored in removable digital storage media connected to direct print adapter 10 via media reader 12 is read and transferred to RAM 41 using DMA controller 43. In step S1025, it is determined whether the next image was successfully read and transferred, and if successful the transferred image is resized in step S1030 in accordance with the target print size set in step S1015. The resized image data is then stored in a print buffer in RAM 41 in a location corresponding to its position within the index print.

In step S1040 it is determined if the last image stored in the print buffer is the last image in a horizontal line of the index print, and if so, the horizontal line of resized images is sent to the printer for printing and the print buffer is emptied in step S1045. If the last resized image data is not the last image in a horizontal line of the index print, step S1040 returns to process to step S1020 to read the next stored image.

In step S1050, it is determined whether the last line of images sent to the printer in step S1045 is the last line of images on the current page of the index print being performed. If the line of images last sent to the printer was the last line on the current page of the index print, the page is refreshed, a new index page is started in step S1055, and the process returns to step S1020 to read the next stored image. If not, step S1050 returns the process to S1020 for reading the next stored image without starting a new index page.

If it is determined in step S1025 that reading an image in step 1020 was not successful, for example, if no more images remain in the removable digital storage media to be read, the process proceeds to step S1060, where it is determined if there are any resized images awaiting printing in the print buffer. If there are images remaining, the process proceeds to step S1045 and the resized images are sent to the printer. If there are no resized images waiting in the print buffer, processing ends in step S1065.

The present invention has been described with particular illustrative embodiments. It is to be understood, however, that the invention is not limited to the embodiments described above. Various changes and modifications may be made to the invention by those of ordinary skill in the art without departing from the spirit and scope of the invention.

What is claimed is:

1. An access device for accessing data stored on a removable digital storage medium, the access device being connectable to a printing device and a computing device, said access device comprising:
    a media interface to the removable digital storage medium;
    a device interface to the printing device and the computing device;
    one or more buttons; and
    selection means for selecting an operating mode from two or more operating modes,
    wherein the two or more operating modes include a direct-print mode and a client mode, wherein said one or more buttons launch one or more software modules in said access device when in the direct-print mode and launch one or more software modules in the computing device when in the client mode.

2. An access device according to claim 1, wherein said device interface to the printing device and the computing device is a bi-directional interface having a bus architecture.

3. An access device according to claim 1, wherein said device interface to the printing device and the computing device includes a host interface for connecting to the printing device and a client interface for connecting to the computing device.

4. An access device according to claim 1, wherein said selection means selects the direct-print mode when said access device is connected to the printing device and selects the client mode when said access device is connected to the computing device.

5. An access device according to claim 1, further comprising display means for displaying the operating mode selected by said selection means.

6. An access device according to claim 1, wherein each of said one or more buttons are assignable to one or more software modules in said access device and one or more software modules in the computing device.

7. An access device according to claim 1, wherein the one or more software modules in said access device and the one or more software modules in the computing device include one or more software modules having printing functionality.

8. An access device according to claim 1, wherein the one or more software modules in said access device and the one or more software modules in the computing device include one or more software modules having printer adjustment functionality.

9. An access device according to claim 1, wherein the one or more software modules in the computing device include one or more software modules having media access functionality.

10. An access device according to claim 1, further comprising a power switch, wherein said selection means selects the direct-print mode if the power switch is on and the printing device is connected to said device interface.

11. An access device according to claim 1, further comprising:
    a memory for storing up to a plurality of print drivers; and
    a processor for selecting and loading one of the up to a plurality of print drivers stored in said memory,
    wherein when the printing device is connected to said device interface in the direct-print mode, said processor determines a type of the printing device, selects one of the up to a plurality of print drivers stored in said memory corresponding to the determined type of the printing device, and loads the selected print driver.

12. A method for controlling an access device for accessing data stored on a removable digital storage medium, said method comprising the steps of:
    connecting the access device to either a printing device or a computing device;
    determining a relationship between the access device and the connected printing device or computing device; and
    selecting an operating mode from two or more operating modes in accordance with the determined relationship,
    wherein the two or more operating modes include a direct-print mode and a client mode, wherein one or more buttons on the access device launch one or more software modules in the access device when in the direct-print mode and launch one or more software modules in the computing device when in the client mode.

13. A method for controlling an access device according to claim 12, wherein the direct-print mode is selected in said selecting step when the access device is connected to the printing device and the client mode is selected in said selecting step when the access device is connected to the computing device.

14. A method for controlling an access device according to claim 12, said method further comprising the step of displaying the operating mode selected in said selecting step.

15. A method according to claim 12, wherein the direct-print mode is selected in said selecting step if a power switch on the access device is on and the printing device is connected to the access device.

16. A method according to claim 12, said method further comprising the steps of:

determining a type of the printing device connected to the access device;

selecting one of up to a plurality of print drivers stored in a memory of the access device corresponding to the type printing device determined in said type determining step; and loading the print driver selected in said print driver selecting step.

\* \* \* \* \*